(12) United States Patent
Spertus et al.

(10) Patent No.: US 8,978,116 B1
(45) Date of Patent: Mar. 10, 2015

(54) METHOD AND APPARATUS FOR MONITORING AN ONLINE IDENTITY OF A USER ON A NETWORK

(75) Inventors: Michael Spertus, Wilmette, IL (US); Robert Walters, Mendon, MA (US); Gerry Egan, Santa Monica, CA (US)

(73) Assignee: Symantec Corporation, Mountain View, CA (US)

( * ) Notice: Subject to any disclaimer, the term of this patent is extended or adjusted under 35 U.S.C. 154(b) by 1626 days.

(21) Appl. No.: 11/731,322

(22) Filed: Mar. 30, 2007

(51) Int. Cl.
*H04L 29/00* (2006.01)

(52) U.S. Cl.
USPC .............. 726/7; 726/3; 726/4; 726/5; 726/6; 726/20

(58) Field of Classification Search
USPC .............................. 713/182, 185; 726/3–7, 20
See application file for complete search history.

(56) References Cited

U.S. PATENT DOCUMENTS

| | | | | |
|---|---|---|---|---|
| 7,356,703 | B2* | 4/2008 | Chebolu et al. | 713/182 |
| 7,444,518 | B1* | 10/2008 | Dharmarajan et al. | 713/185 |
| 2001/0047310 | A1* | 11/2001 | Russell | 705/26 |
| 2001/0049796 | A1* | 12/2001 | Roth et al. | 713/201 |
| 2002/0049806 | A1* | 4/2002 | Gatz et al. | 709/203 |
| 2006/0031494 | A1* | 2/2006 | Marcus et al. | 709/225 |
| 2006/0059434 | A1* | 3/2006 | Boss et al. | 715/780 |
| 2008/0222271 | A1* | 9/2008 | Spires | 709/218 |

* cited by examiner

*Primary Examiner* — Jeffrey Pwu
*Assistant Examiner* — Helai Salehi
(74) *Attorney, Agent, or Firm* — Wilmer Cutler Pickering Hale and Dorr LLP

(57) ABSTRACT

Method for monitoring an online identity of a user on a network is described. In one example, data exchanged between a browser client on a device associated with the user and the network is monitored. Creation or use of an online identity by the user is detected within the data. The online identity is associated with a host site. The host site may be any of a plurality of point of presence sites. A notification of the online identity is generated for presentation to a custodian of the user. The notification may then be sent to the custodian.

17 Claims, 3 Drawing Sheets

METHOD AND APPARATUS FOR MONITORING AN ONLINE IDENTITY OF A USER ON A NETWORK

BACKGROUND OF THE INVENTION

1. Field of the Invention

The present invention relates generally to monitoring network transactions. More particularly, the present invention relates to a method and apparatus for monitoring an online identity of a user on a network.

2. Description of the Related Art

The internet and the World Wide Web ("web") have become available to a large amount of people of different age, background, and type. Since accessing the web has become common among children, parents have become concerned about their children's transactions with strangers. Parents have continuously tried to protect their children from external temptations and unsuitable transactions available over the Internet. Notably, parents are being warned to monitor any public online presence of their children (referred to as an "online identity"). A child may create and maintain an online identity through a social networking site, such as MYSPACE, XANGA, FACEBOOK, WINDOWS LIVE SPACES, ORKUT, BEBO, FRIENDSTER, FACEPARTY, and the like. A child may also create and maintain an online identity using other mechanisms, such as blogs, message boards, and the like. Using such an online identity, a child is able to contact individuals across the world, participate in transactions, chat, meet new people, and the like, all of which without parental supervision and, in many cases, without parental knowledge. The vast number of social network sites, message boards, blogs, and the like make it difficult for parents to know what to monitor in order to protect their children. Accordingly, there exists a need in the art for a method and apparatus for monitoring creation of an online identity by a user, such as a child.

SUMMARY OF THE INVENTION

Method for monitoring an online identity of a user on a network is described. In one embodiment, data exchanged between a browser client on a device associated with the user and the network is monitored. Creation or use of an online identity by the user is detected within the data. The online identity is associated with a host site. The host site may be any of a plurality of point of presence sites. A notification of the online identity is generated for presentation to a custodian of the user. The notification may then be sent to the custodian.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
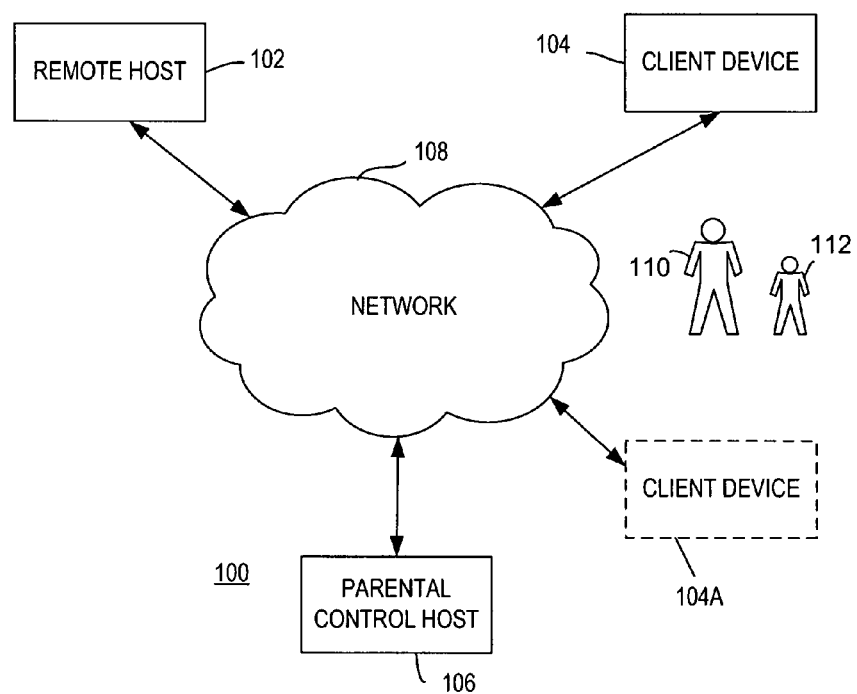
FIG. 1 is a block diagram depicting an exemplary embodiment of a networked computer system in accordance with one or more aspects of the invention.

FIG. 1 is a block diagram depicting an exemplary embodiment of a networked computer system 100 in accordance with one or more aspects of the invention. In one embodiment, the system 100 includes a client device 104 and a parental control host 106, each coupled to a network 108. The network 108 comprises a communication system that connects computer systems by wire, cable, fiber optic, and/or wireless links facilitated by various types of well-known network elements, such as hubs, switches, routers, and the like. The network 108 may employ various well-known protocols to communicate information. For example, the network 108 may be part of the Internet. The client device 104 may be any type of device capable of sending electronic data over the network 108, such as, personal computers (PCs), personal digital assistants (PDAs), wireless telephones, and the like. The parental control host 106 may comprise a computer capable of implementing a parental control service for a plurality of clients, as described below.

In the present example, the client device 104 includes a user 110 and a user 112. The user 112 is illustratively a minor child and the user 110 is illustratively a parent or guardian of the minor child 112 (the term "parent" as used herein is meant to encompass both a parent and a guardian). Although a parent/child relationship among the users is described as an example, in general it is assumed that the user 110 is a custodian that exhibits some form of custodial control over the user 112. For example, it is not necessary that the user 112 be a minor child, be an actual child of the user 110, or even be related to the user 110. Likewise, it is not necessary that the user 110 be a parent of the user 112 or be related to the user 112.

The client device 104 is configured to exchange data with remote hosts on the network 108, such as a remote host 102, using a browser client (e.g., MICROSOFT INTERNET EXPLORER, MOZILLA FIREFOX, and the like). The parent 110 is configured to register with the parental control host 106 to establish a monitoring service. Registration may comprise, for example, the establishment of an account accessible by a username/password or like type digital identity of the parent 110. Through registration, a profile is created for the child 112. The profile may include contact information for the parent 110. The contact information allows the parental control host 106 to send notifications to the parent 110. The contact information may include an e-mail address, telephone number, residence address, or like type information. The contact information may be associated with a device other than the client device 104, such as a client device 104A. This may decrease the possibility of the child 112 intercepting notifications intended for the parent 110. The profile may also include a list of approved online identities for the child 112. The profile may be assigned an identifier used for later retrieval.

As described in more detail below, the parental control host 106 is configured to cooperate with the client device 104 for monitoring data exchanged between a browser client on the device 104 and a remote host. The parental control host 106 detects creation or use of an online identity for the child 112.

The parental control host 106 sends a notification of such creation or use of an online identity by the child 112 to the parent 110.

Figure 2:
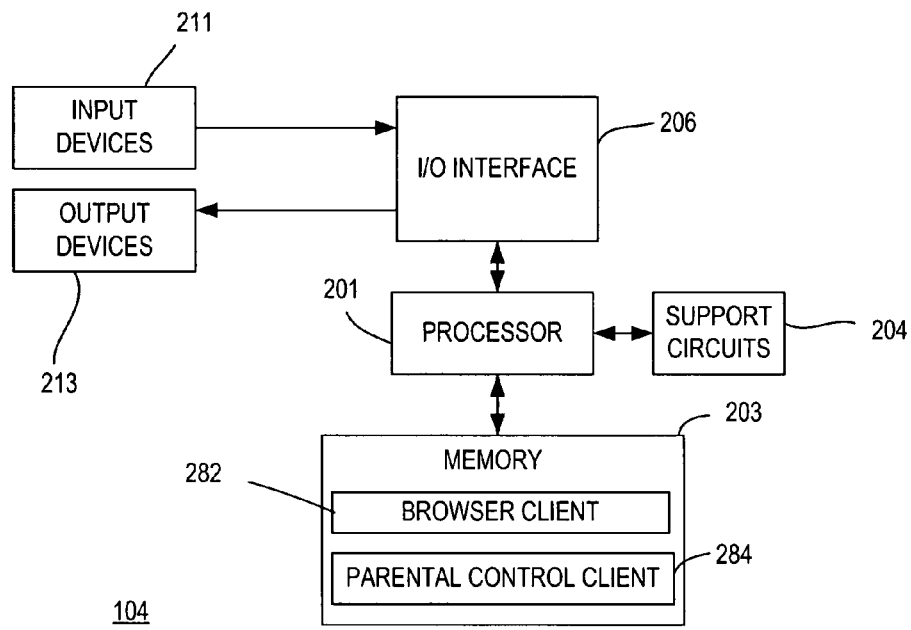
FIG. 2 is a block diagram depicting an exemplary embodiment of a client device computer in accordance with one or more aspects of the invention.

FIG. 2 is a block diagram depicting an exemplary embodiment of a computer 200 in accordance with one or more aspects of the invention. The computer may be used to implement the client device 104 and/or the client device 104A of FIG. 1. The computer 200 illustratively includes a processor 201, a memory 203, various support circuits 204 and an I/O interface 206. The processor 201 may include one or more microprocessors known in the art. The support circuits 204 for the processor 201 include conventional cache, power supplies, clock circuits, data registers, I/O interfaces, and the like. The I/O interface 206 may be directly coupled to the memory 203 or coupled through the processor 201. The I/O interface 206 may also be configured for communication with input devices 211 and/or output devices 213, such as a display, mouse, keyboard, and the like. The I/O interface 206 is also coupled to the network 108 for communication with remote hosts, including the parental control host 106.

The memory 203 stores processor-executable instructions and/or data that may be executed by and/or used by the processor 201. These processor-executable instructions may comprise hardware, firmware, software, and the like, or some combination thereof. Modules having processor-executable instructions that are stored in the memory 203 may include a browser client 282 and a parental control client 284, which are discussed below. The computer 200 may be programmed with an operating system, which may include OS/2, Java Virtual Machine, Linux, Solaris, Unix, HPUX, AIX, Windows, among other known platforms. At least a portion of the operating system may be disposed in the memory 203. The memory 203 may include one or more of the following random access memory, read only memory, magneto-resistive read/write memory, optical read/write memory, cache memory, magnetic read/write memory, and the like, as well as signal-bearing media as described below.

Figure 3:
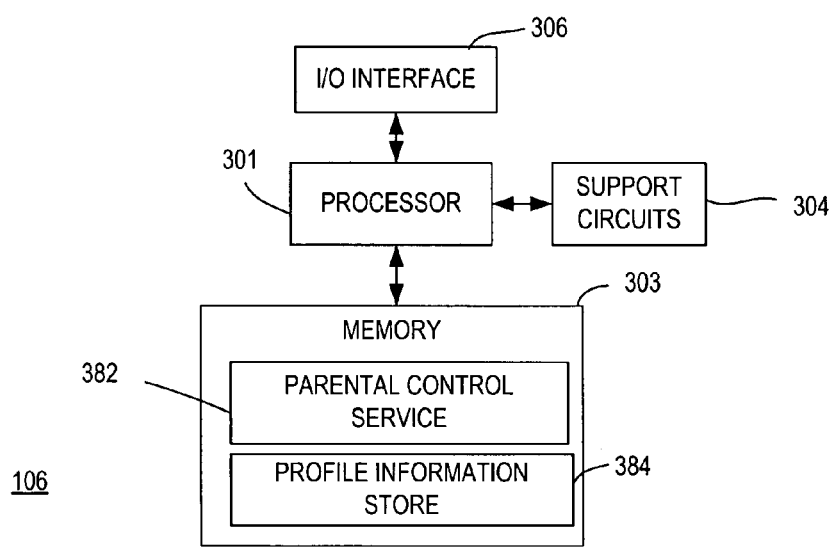
FIG. 3 is a block diagram depicting an exemplary embodiment of a parent control host computer in accordance with one or more aspects of the invention.

FIG. 3 is a block diagram depicting an exemplary embodiment of a computer 300 suitable for use as the parental control host 106 in accordance with one or more aspects of the invention. The computer 300 illustratively includes a processor 301, a memory 303, various support circuits 304, and an I/O interface 306. The processor 301 may include one or more microprocessors known in the art. The support circuits 304 for the processor 301 include conventional cache, power supplies, clock circuits, data registers, I/O interfaces, and the like. The I/O interface 306 may be directly coupled to the memory 303 or coupled through the processor 301. The I/O interface 306 is coupled to the network 108 for communication with clients, such as the client device 104 and the client device 104A.

The memory 303 stores processor-executable instructions and/or data that may be executed by and/or used by the processor 301. These processor-executable instructions may comprise hardware, firmware, software, and the like, or some combination thereof. Modules having processor-executable instructions that are stored in the memory 303 may include a parental control service 382. Data stored in the memory 303 may include a profile information store 384. The computer 300 may be programmed with an operating system, which may include OS/2, Java Virtual Machine, Linux, Solaris, Unix, HPUX, AIX, Windows, among other known platforms. At least a portion of the operating system may be disposed in the memory 303. The memory 303 may include one or more of the following random access memory, read only memory, magneto-resistive read/write memory, optical read/write memory, cache memory, magnetic read/write memory, and the like, as well as signal-bearing media as described below.

With reference to FIGS. 1-3, the parental control client 284 is configured to monitor data exchanged between the browser client 282 and the network 108. The data may have various formats, including data formatted in accordance with hypertext transfer protocol (HTTP) and/or related protocols. In one embodiment, the parental control client 284 is configured to process all incoming and outgoing network traffic to and from the browser client 282. The parental control client 284 analyzes the network traffic to detect creation of an online identity by the child 112 associated with a host site. The host site may be any of a plurality of point of presence sites, such as social networking sites, message board sites, blog sites, or the like.

In one embodiment, the parental control client 284 analyzes web pages that convey online identities. The web pages may be obtained by analyzing HTTP traffic. For example, when an account is being created, a web page may include constructs that elicit identity information. Such constructs may include, for example, web forms created using hypertext markup language (HTML), extensible markup language (XML), Javascript, Java, or the like. Detection of such identity eliciting constructs may be indicative of online identity creation. The parental control client 284 may be configured with a list of known social network sites, blog sites, message board sites, and the like. This list may be updated periodically by the parental control service 382, which may maintain an up-to-date list of such sites. The parental control client 284 may analyze web pages to detect indicia related to the listed sites. In this manner, the parental control client 284 captures information related to a created online identity for the child 112. Such information may include attributes of the online identity (username or handle of the child 112, date created, information entered by the child 112, etc.), the host of the online identity, web pages conveying the online identity, hyperlinks to such web pages, and the like, or a combination of such information. The parental control client 284 sends the captured information to the parental control service 382. In one embodiment, the parental control client 284 employs a filter and/or network client "plug-in" to capture online identity and host information. For example, the parental control client 284 may employ an HTTP filter and/or a browser helper object.

In some cases, the child 112 may create an online identity using another device that does not monitor or have the parental control client 284. When the child 112 returns to using the device 104, the exchanged data will likely not including any data indicative of online identity creation. Thus, in some embodiments, the parental control client 284 is configured to analyze the network traffic to detect use of an online identity by the child 112. For example, the parental control client 284 may analyze web pages that initiate an account login. From the account logic, the parental control client 284 obtains the identity of the host, along with information related to the online identity of the child 112. The parental control client 284 then sends the captured information to the parental control service 382. Detection of account login may be performed using a filter and/or network client "plug-in," such as an HTTP filter and/or browser helper object.

The parental control service 382 receives online identity and host information from the parental control client 284. The profile information store 384 includes profiles for various children of parent subscribers. The parental control service 382 compares the received online identity against those in a list of approved online identities in the profile for the child 112 to determine if a new online identity has been created or used by the child 112. If a new online identity has been created or used, the parental control service 382 generates a notification of the creation/use of the online identity. The notification may be sent to the parent 110 using the contact information of the parent 110 in the profile. Alternatively, the notification may be logged for viewing by the parent 110 when the parent 110 logs into the parental control host 106. The notification may include information indicative of the online identity (e.g., handle, user entered information, host site, etc.), one or more images of web page(s) conveying the online identity, one or more hyperlinks to web page(s) that convey the online identity, or the like, or any combination of such information.

Aspects of the invention may be understood with reference to the following exemplary scenario. Assume the parent 110 registers with the parental control host 106 to create a profile for the child 112. The profile may be assigned an identifier so that it can be retrieved during later analysis. The profile may include a list of approved online identities of the child 112, along with an e-mail address of the parent 110. The parental control client 284 is then configured to monitor network traffic to and from the browser client 282 to detect online identity creation and/or use. This configuration of the parental control client 284 may be performed by the parental control service 382 or by the parent 110. Assume the child 112 navigates to a web page used to create an online identity at a specific social network site. The parental control client 284 detects the web page as creating the online identity and captures data, including information related to the online identity and the social networking site. The parental control client 284 sends the online identity and host information to the parental control service 382, along with the identifier associated with the child 112. The parental control service 382 retrieves the profile based on the identifier and compares the online identity with the list of approved online identities. The parental control service 382 generates a notification if the detected online identity is newly created or used and not yet approved. The notification can then be sent to the e-mail address of the parent 110. This notifies the parent 110 that the child 112 has created or used a new online identity, allowing the parent 110 to take the appropriate action.

Those skilled in the art will appreciate that the functions performed by the parental control client 284 and the functions performed by the parental control service 382 may be performed by the same computer. For example, the functions performed by the parental control client 284 may be performed by the parental control host 106. That is, the parental control host 106 may be configured to monitor data exchanged by the browser client 282. This may be achieved, for example, by configuring the network browser client 282 to use the parental control host 106 has a proxy such that network traffic to and from the browser client 282 is routed through the parental control host 106.

Figure 4:
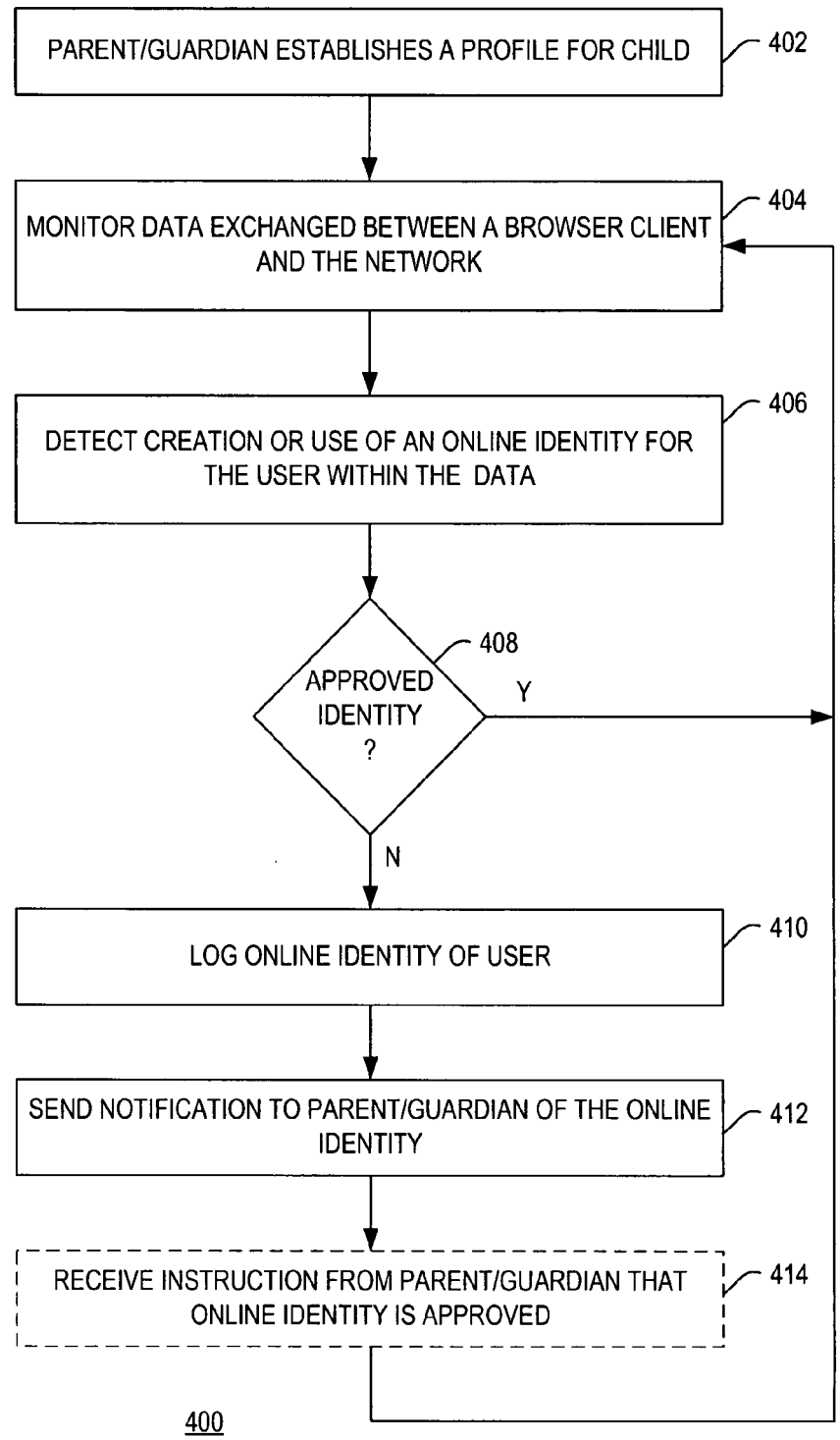
FIG. 4 is a flow diagram depicting an exemplary embodiment of a method 400 for detecting creation and/or use of an online identity by a user in accordance with one or more aspects of the invention.

FIG. 4 is a flow diagram depicting an exemplary embodiment of a method 400 for detecting creation or use of an online identity by a user in accordance with one or more aspects of the invention. The method 400 begins at step 402, where a parent/guardian (or other custodian) establishes a profile for the user (e.g., a child). The profile may include a list of approved online identities, as well as contact information for the parent/guardian. The profile may be assigned an identifier for later retrieval. At step 404, data exchanged between a browser client and the network is monitored. At step 406, creation and/or use of an online identity by the user is detected by analyzing the monitored data. The online identity is associated with any of a plurality of point of presence sites, such as social network sites, message boards, and blog sites.

At step 408, a determination is made whether the newly created and/or used online identity is on the list of approved online identities. If so, the method 400 returns to step 404 and continues to monitor the data. Otherwise, the method 400 proceeds step 410. At step 410, information related to the online identity is logged. Such information may include attributes of the online identity (handle, date created, information entered by the user, etc.), the host of the online identity, web pages conveying the online identity, hyperlinks to such web pages, and the like, or a combination of such information. At step 412, a notification may be sent to the parent/guardian that includes the logged information. At step 414, an instruction may be received from the parent/guardian that the newly created and/or used online identity has been approved. The method 400 then returns to step 404 and continues monitoring.

Method and apparatus for monitoring an online identity of a user on a network has been described. In one embodiment, traffic exchanged between a browser client and the network is monitored on a client device associated with a user, such as a child. The traffic is analyzed to detect creation of an online identity or use of an already created online identity by the user. The created or used online identity is then compared against a list of approved online identities for the user. If the created or used online identity is not approved, a notification is generated that includes information related to the online identity, such as online identity attributes (handle, date created, other user entered data), host of the online identity, web pages conveying the online identity, hyperlinks to such web pages, or a combination of such information. The notification may be sent to a custodian of the user (e.g., parent/guardian). The present invention does not require the custodian to know any usernames, handles, e-mail addresses of the user in order to initiate monitoring. The custodian need only submit contact information (if automatic contact is desired) and any approved online identities of which the custodian is aware. Online identity creation or use is detected using network traffic exchanged with the source, i.e., the computer used to generate or use the online identity. The present invention does not require any continuous monitoring of various host sites, such as social networking sites, in order to detect creation of an online identity for the child.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method of detecting use of a new online identity by a user on a network, comprising:

receiving, using a first computer, a first request from a custodian of the user to create a user profile, wherein the user profile comprises contact information of the custodian and information about at least one custodian-approved online identity associated with at least one of a plurality of point of presence sites;

monitoring, using the first computer, data conveyed in incoming and outgoing traffic between a browser client on the first computer and the network;

detecting, using the first computer and within the data, the use of the new online identity by a host site to identify the user based on profile information for the user, wherein the host site is at least one of the plurality of point of presence sites, and wherein the new online identity was created using a second computer not being monitored;

comparing, using the first computer, the new online identity with the user profile to determine whether the new online identity is custodian-approved; and sending, using the first computer and the contact information of the custodian, a notification of the new online identity for presentation to the custodian of the user if the new online identity is not custodian-approved.

2. The method of claim 1, wherein the step of detecting the use of the new online identity comprises:

detecting use of an account on the host site by the user, the host site conveying the new online identity.

3. The method of claim 1, wherein the plurality of point of presence sites comprises a social networking site, a blog site, and a message board site.

4. The method of claim 1, wherein the notification includes at least one of:

one or more identity attributes, an identity of the host site conveying the new online identity, one or more web pages conveying the new online identity, or one or more hyperlinks for accessing the new online identity.

5. The method of claim 1, wherein the step of monitoring comprises:

processing hypertext transfer protocol (HTTP) network traffic at the first computer using at least one of an HTTP filter or a browser helper object to obtain the data.

6. The method of claim 1, wherein the step of detecting the use of the new online identity comprises:

detecting a login to a web site conveying the new online identity.

7. The method of claim 1, wherein the user comprises a minor child and wherein the custodian comprises a parent or guardian of the minor child.

8. The method of claim 5, wherein the step of detecting the use of the new online identity further comprises:

detecting, within the data, at least one web page conveying the new online identity using at least one of the HTTP filter or the browser helper object.

9. An apparatus for detecting use of a new online identity by a user on a network, comprising:

means for receiving, using a first device, a first request from a custodian of the user to create a user profile, wherein the user profile comprises contact information of the custodian and information about at least one custodian-approved online identity associated with at least one of a plurality of point of presence sites;

means for monitoring data conveyed in incoming and outgoing traffic between a browser client on the first device and the network;

means for detecting, within the data, the use of the new online identity by a host site to identify the user based on profile information for the user, wherein the host site is at least one of the plurality of point of presence sites, and wherein the new online identity was created using a second device not being monitored;

means for comparing the new online identity with the user profile to determine whether the new online identity is custodian-approved; and means for sending a notification of the new online identity using the contact information of the custodian for presentation to the custodian of the user if the new online identity is not custodian-approved.

10. The apparatus of claim 9, wherein the means for detecting the creation or use of the new online identity comprises:

means for detecting use of an account on the host site by the user, the host site conveying the new online identity.

11. The apparatus of claim 9, wherein the notification includes at least one of: one or more identity attributes, an identity of the host site conveying the new online identity, one or more web pages conveying the new online identity, or one or more hyperlinks for accessing the new online identity.

12. The apparatus of claim 9, wherein the means for monitoring comprises:

means for processing hypertext transfer protocol (HTTP) network traffic at the first device using at least one of an HTTP filter or a browser helper object to obtain the data.

13. The apparatus of claim 9, wherein the means for detecting the creation or use of the new online identity comprises:

means for detecting a login to a web site conveying the new online identity.

14. The apparatus of claim 12, wherein the means for detecting the use of the new online identity further comprises:

means for detecting, within the data, at least one web page conveying the new online identity using at least one of the HTTP filter or the browser helper object.

15. A system for detecting use of a new online identity by a user on a network, comprising:

a client for receiving, using a first computer, a first request from a custodian of the user to create a user profile, wherein the user profile comprises contact information of the custodian and information about at least one custodian-approved online identity associated with at least one of a plurality of point of presence sites, monitoring data conveyed in incoming and outgoing traffic between a browser client on a first device associated with the user and the network, obtaining information related to the use of the new online identity by a host site to identify the user by the user associated with a host site based on profile information for the user, wherein the host site is at least one of the plurality of point of presence sites, and wherein the new online identity was created using a second computer not being monitored, comparing the information against the profile for the user to determine whether the new online identity is custodian-approved, and sending a notification of the new online identity using the contact information of the custodian for presentation to a custodian of the user if the new online identity is not custodian-approved.

16. The system of claim 15, wherein the client is configured to:

detect the use of an account on the host site by the user, the host site conveying the new online identity.

17. The system of claim 15, wherein the notification includes at least one of: one or more identity attributes, an identity of the host conveying the new online identity, one or more web pages conveying the new online identity, or one or more hyperlinks for accessing the new online identity.

* * * * *